United States Patent
Tian et al.

(10) Patent No.: US 10,906,640 B2
(45) Date of Patent: Feb. 2, 2021

(54) MULTI-ROTOR UNMANNED AERIAL VEHICLE

(71) Applicant: Haoxiang Electric Energy (Kunshan) Co., Ltd., Jiangsu (CN)

(72) Inventors: Yu Tian, Jiangsu (CN); Wenyan Jiang, Jiangsu (CN)

(73) Assignee: Haoxiang Electric Energy (Kunshan) Co., Ltd., Jiangsu (CN)

( * ) Notice: Subject to any disclaimer, the term of this patent is extended or adjusted under 35 U.S.C. 154(b) by 518 days.

(21) Appl. No.: 15/851,533

(22) Filed: Dec. 21, 2017

(65) Prior Publication Data

US 2018/0111685 A1   Apr. 26, 2018

(30) Foreign Application Priority Data

Dec. 27, 2016  (CN) ..................... 2016 2 1449436 U
Dec. 27, 2016  (CN) ..................... 2016 2 1449501 U

(51) Int. Cl.
| | |
|---|---|
| B64C 39/02 | (2006.01) |
| B64C 25/52 | (2006.01) |
| B64C 25/10 | (2006.01) |
| B64C 1/06 | (2006.01) |
| B64C 1/14 | (2006.01) |

(52) U.S. Cl.
CPC ............ *B64C 39/024* (2013.01); *B64C 1/069* (2013.01); *B64C 25/10* (2013.01); *B64C 25/52* (2013.01); *B64C 1/1484* (2013.01); *B64C 2201/024* (2013.01); *B64C 2201/027* (2013.01); *B64C 2201/108* (2013.01); *B64C 2201/165* (2013.01)

(58) Field of Classification Search
CPC ....... B64C 39/024; B64C 25/52; B64C 25/10; B64C 1/069; B64C 2201/027; B64C 1/1484; B64C 2201/024; B64C 2201/108; B64C 2201/165
See application file for complete search history.

(56) References Cited

U.S. PATENT DOCUMENTS

| | | | |
|---|---|---|---|
| 2017/0168481 A1* | 6/2017 | Flanigan | G01R 29/0892 |
| 2019/0291864 A1* | 9/2019 | Liu | B64C 39/024 |
| 2019/0373173 A1* | 12/2019 | Wang | B64D 47/08 |
| 2020/0141771 A1* | 5/2020 | Wang | G01D 11/30 |

* cited by examiner

*Primary Examiner* — Valentina Xavier

(57) ABSTRACT

A multi-rotor UAV (unmanned aerial vehicle) includes a fuselage, four aircraft wings and a landing stand, wherein the landing stand comprises four landing support legs, every landing support leg is installed below an outermost end of a corresponding aircraft wing to form a landing support structure of the UAV, every landing support leg comprises a main pole and a base soft rubber, wherein the base soft rubber enwraps a base of the main pole for buffering. The multi-rotor UAV of the present invention is stable while taking off or landing, and is light in weight.

12 Claims, 4 Drawing Sheets

MULTI-ROTOR UNMANNED AERIAL VEHICLE

CROSS REFERENCE OF RELATED APPLICATION

The present invention claims priority under 35 U.S.C. 119(a-d) to CN 201621449501.9, filed Dec. 27, 2016 and CN 201621449436.X, filed Dec. 27, 2016.

BACKGROUND OF THE PRESENT INVENTION

Field of Invention

The present invention relates to a technical field of UAV (unmanned aerial vehicle), and more particularly to a multi-rotor UAV.

Description of Related Arts

Unmanned aerial vehicles (UAVs for short) are operated by radio remote control devices and their own program control devices. Due to flying in the air, the UAV suffers greater resistance, and also needs to frequently experience the vibration of the ups and downs, and therefore there is a certain requirement for the strength performance of the fuselage and the aircraft arms of the UAV. In existing UAVs, the upper aircraft casing and are connected with the lower aircraft casing by screws, so that both the upper aircraft casing and the lower aircraft casing need to be disassembled each time when internal electronic circuits are repaired. Since the aircraft arms and the aircraft casings are integrally formed to strengthen the connection performance therebetween, when the aircraft casings are disassembled, the aircraft arms also need to be disassembled together, which is inconvenient for the assembly and disassembly of the aircraft arms and the aircraft casings, and the intensity of the aircraft arms and the aircraft casings is not high.

Generally, the UAV comprises a landing stand which is adapted for contacting with ground to support the whole UAV when the UAV takes off and lands. When the UAV takes off and lands, it will produce a certain impact on the ground. If the landing stand takes off and lands unstably, the internal circuit module of the UAV will vibrate, resulting in signal instability and other issues. Moreover, all gravity of the entire VAV falls at the landing site of the landing stand, so the stability and solidity of the landing stand are very important to the entire UAV.

The existing landing stand of the UAV is generally located below the fuselage or near the fuselage, and if the ground support area is small, the UAV easily dumps sideways, so the general landing stand requires the support surface with a larger area, which increases material costs, makes the weight of the aircraft body overweight, and also occupies very large space.

SUMMARY OF THE PRESENT INVENTION

A technical problem to be solved is to provide a multi-rotor UAV (unmanned aerial vehicle) which is stable while taking off or landing and is light in weight.

To solve the above problem, the present invention provides a multi-rotor UAV (unmanned aerial vehicle) comprising a fuselage and multiple aircraft arms, wherein the fuselage comprises an upper fuselage casing, a lower fuselage casing and a bottom cover; the aircraft arms comprise upper aircraft arms and lower aircraft arms; the upper fuselage casing and the upper aircraft arms are integrally formed to obtain an upper aircraft housing; the low fuselage casing and the lower aircraft arms are integrally formed to obtain a lower aircraft housing; the upper aircraft housing is in non-detachable connection with the lower aircraft housing, so as to form an internal aircraft cavity for accommodating an electronic apparatus; the lower aircraft housing has a window; the bottom cover is detachably connected with the lower aircraft housing to open or close the window.

Preferably, the window is provided from a fuselage head to a fuselage tail, the bottom cover matches with a window edge of the window for connection.

Preferably, a connection part of the bottom cover and the window edge of the window is a curved part that gradually curves towards the upper aircraft housing at the fuselage head and the fuselage tail.

Preferably, the bottom cover has a lens through-hole therein corresponding to the fuselage head for allowing a lens in the internal aircraft cavity to extend outwardly.

Preferably, the bottom cover is buckled with the lower aircraft housing.

Preferably, the bottom cover is buckled with the lower aircraft housing.

Preferably, two hooks which are protruded outwardly are respectively located at two sides of a middle portion of the bottom cover, an inwardly protruded hook is located at a tail of the bottom cover, a hook hole for cooperating with the inwardly protruded hook is provided at a position of the window edge at the tail of the window of the lower aircraft housing corresponding to the inwardly protruded hook.

Preferably, two hooks which are protruded outwardly are respectively located at two sides of a middle portion of the bottom cover, an inwardly protruded hook is located at a tail of the bottom cover, a hook hole for cooperating with the inwardly protruded hook is provided at a position of the window edge at the tail of the window of the lower aircraft housing corresponding to the inwardly protruded hook.

Preferably, the electronic apparatus comprises multiple circuit modules and a circuit board, wherein the multiple circuit modules are modularly assembled to the circuit board, the circuit board is connected with the upper aircraft housing through a vibration attenuation connector, a vibration attenuation pad is located between the circuit board and the closed bottom cover.

Preferably, the multi-rotor UAV further comprises multiple propeller seats and multiple paddles, wherein the propeller seats and the paddles are connected and installed to the aircraft arms.

Preferably, the multi-rotor UAV further comprises multiple protection frames each of which comprises an embracing portion and an expanding portion, wherein a projection is located at an inner side of the embracing portion; a side wall of every aircraft arm where one propeller seat and one paddle are installed has slots; the embracing portion of one protection frame embraces the side wall of one aircraft arm and the projection is inserted into the slots.

Preferably, the multi-rotor UAV further comprises a foldable landing stand which is located below a corresponding propeller seat and a corresponding paddle of every aircraft arm and is able to rotate relatively to the connection position of every aircraft arm, so as to be folded or unfolded.

Also, the present invention provides a multi-rotor UAV (unmanned aerial vehicle), which comprises: a fuselage, four aircraft wings and a landing stand, wherein the landing stand comprises four landing support legs, every landing support leg is installed below an outermost end of a corresponding aircraft wing to form a landing support structure of the UAV, every landing support leg comprises a main pole and a base soft rubber, wherein the base soft rubber enwraps a bottom of the main pole for buffering.

Preferably, the base soft rubber and the main pole of every landing support leg are integrally formed through a two-color injection molding process.

Preferably, the base soft rubber of every landing support leg is attached to the bottom of the main pole through adhesive pieces, or the base soft rubber of every landing support leg is fixed to the bottom of the main pole through screws.

Preferably, a connector is connected with a head portion of the main pole and is detachably connected with the outermost end of a corresponding aircraft wing.

Preferably, the main pole is rotatably connected with a corresponding connector to fold a corresponding landing support leg below a corresponding aircraft wing.

Preferably, both the main pole and the connector have a shaft hole, a rigid shaft passes through the shaft hole of both the main pole and the connector to be fixed with one of the main pole and the connector.

Preferably, an interior of the main pole is hollow to form an accommodating cavity.

Preferably, the main pole comprises a vertical groove and a cover plate, wherein the cover plate is able to open or close the vertical slot; the vertical slot and the cover plate forms the accommodating cavity at a closed state.

Preferably, the cover plate and the vertical slot are respectively connected at an end connection position through a plug-in and a first slot, and are respectively connected at a body connection position through a second slot and a hook.

Through the above technical solutions, compared with the prior art, the present invention has beneficially effects as follows.

All the landing support legs are located at the outermost end of the aircraft wings, so the center of gravity of the UAV is more stable and the sideway dumping of the UAV does not easily occur due to instable center of gravity; and also, the contact area of the UAV and the ground is reduced, which saves material costs and is light in weight. After providing the base soft rubber for the landing point, the impact is able to be reduced to a greater extent. When the UAV takes off or lands, the vibration of the UAV is reduced through the buffering between the UAV and the ground.

The base soft rubber and the main pole of every landing support leg are integrally formed, no extra connector is provided between the base soft rubber and the main pole. Therefore, the present invention is more stable in structure and more beautiful in appearance.

Figure 1:
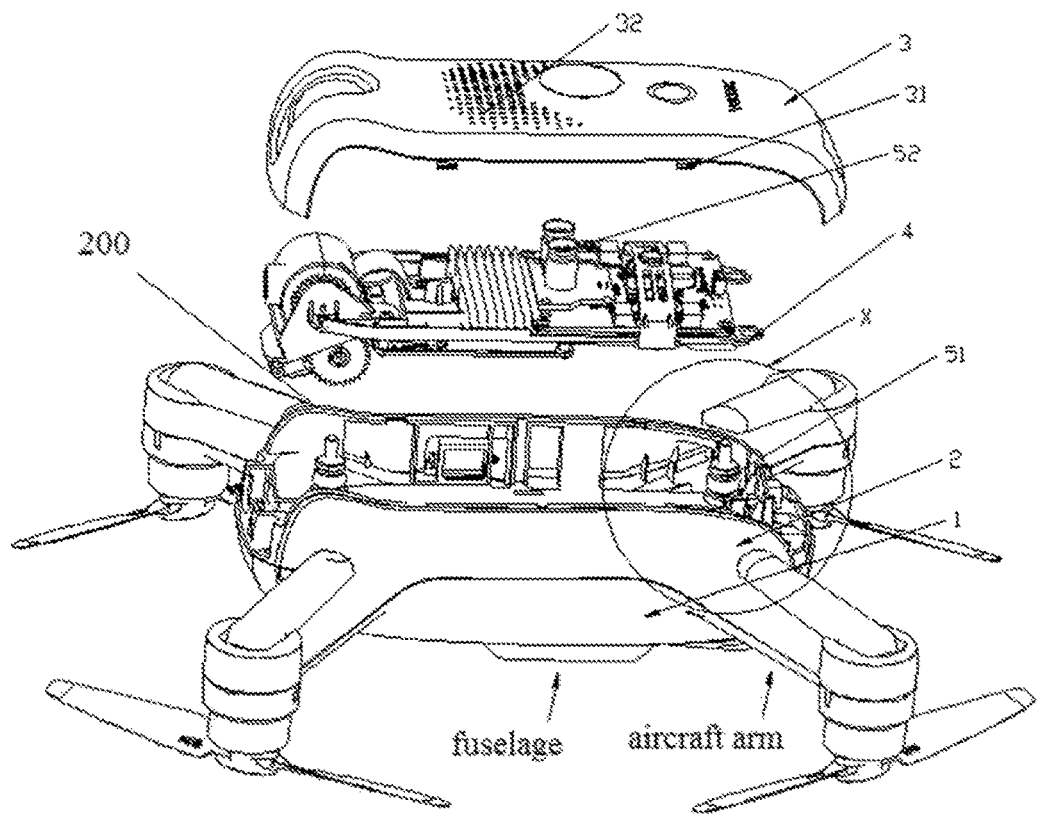
FIG. 1 is an exploded structural schematic diagram of a multi-rotor UAV (unmanned aerial vehicle) according to a first embodiment of the present invention.

In the drawings, 1: upper aircraft housing; 2: lower aircraft housing; 3: bottom cover; 4: electronic apparatus; 6: propeller seat; 7: paddle; 8: foldable landing stand; 9: protection frame; 11: vertical slot; 12: transverse slot; 21 and 22: hook hole; 31: hook; 32: ventilation hole; 51: vibration attenuation connector; 52: vibration attenuation pad; 10: fuselage; 20: aircraft wing; 30: landing support leg; 40: connector; 50: rigid shaft; 200: window; 301: main pole; 302: base soft rubber; 3011: vertical groove; 3012: cover plate.

DETAILED DESCRIPTION OF THE PREFERRED EMBODIMENT

For a better understanding of the above objects, features and advantages of the present invention, the specific embodiments of the present invention are described in detail with accompanying drawings as follows.

In the following description, many specific details are set forth to provide a thorough understanding of the present invention. However, the present invention can be embodied in other ways which are different from those described herein, and those skilled in the art may make similar promotion without departing from the spirit of the present invention. Accordingly, the present invention is not limited to the specific embodiments disclosed below.

Referring to FIGS. 1 to 4, according to a preferred embodiment of the present invention, a multi-rotor UAV (unmanned aerial vehicle) comprises a fuselage and multiple aircraft arms. In the UAV shown in the drawings, there are four aircraft arms, but not limited to this. The fuselage comprises an upper fuselage casing, a lower fuselage casing and a bottom cover; the aircraft arms comprise upper aircraft arms and lower aircraft arms. The upper fuselage casing and the upper aircraft arms are integrally formed to obtain an upper aircraft housing 1. The low fuselage casing and the lower aircraft arms are integrally formed to obtain a lower aircraft housing 2. In other words, the upper fuselage casing and the upper aircraft arms are integrally formed to obtain the upper aircraft housing 1 through an injection molding process; the low fuselage casing and the lower aircraft arms are integrally formed to obtain the lower aircraft housing 2 through the injection molding process; the upper aircraft housing 1 and the lower aircraft housing 2 are separately manufactured.

The upper aircraft housing 1 is in non-detachable connection with the lower aircraft housing 2, so as to form an internal aircraft cavity for accommodating an electronic apparatus 4, wherein the non-detachable connection is that the upper aircraft housing 1 and the lower aircraft housing 2 are bonded together through super glue or are welded together. The lower aircraft housing 2 has a window 200 through which the electronic apparatus 4 is able to be assembled or disassembled in the internal aircraft cavity. The bottom cover 3 is detachably connected with the lower aircraft housing 2 to open or close the window 200.

The integration of the aircraft arms and the fuselage casings is able to ensure the connection strength of the aircraft arms, and also make the upper aircraft housing 1 is in non-detachable connection with the lower aircraft housing 2, so as to further enhance the overall strength of the housings. The window 200 is provided on the lower aircraft housing 2, and is opened or closed through the bottom cover 3, so that while assembling or disassembling the electronic apparatus 4 in the internal aircraft cavity, only the bottom cover 3 needs to be opened or closed without disassembling the aircraft arms together, which facilitates assembling and disassembling. Moreover, the bottom cover 3 is located at a bottom wall of an overall aircraft housing, so that during the work process of the UAV, detachable connection parts are less affected by external forces, thus the UAV is more solid and durable.

In one embodiment, the window 200 is provided from a fuselage head to a fuselage tail, the bottom cover 3 matches with a window edge of the window for connection, such that the bottom cover completely covers a bottom of the overall aircraft housing, so as to facilitate assembling and disassembling the electronic apparatus 4 in the internal aircraft cavity and also enable that the electronic apparatus 4 is wholly installed into the internal aircraft cavity, thus the assembly is more convenient.

Figure 3:
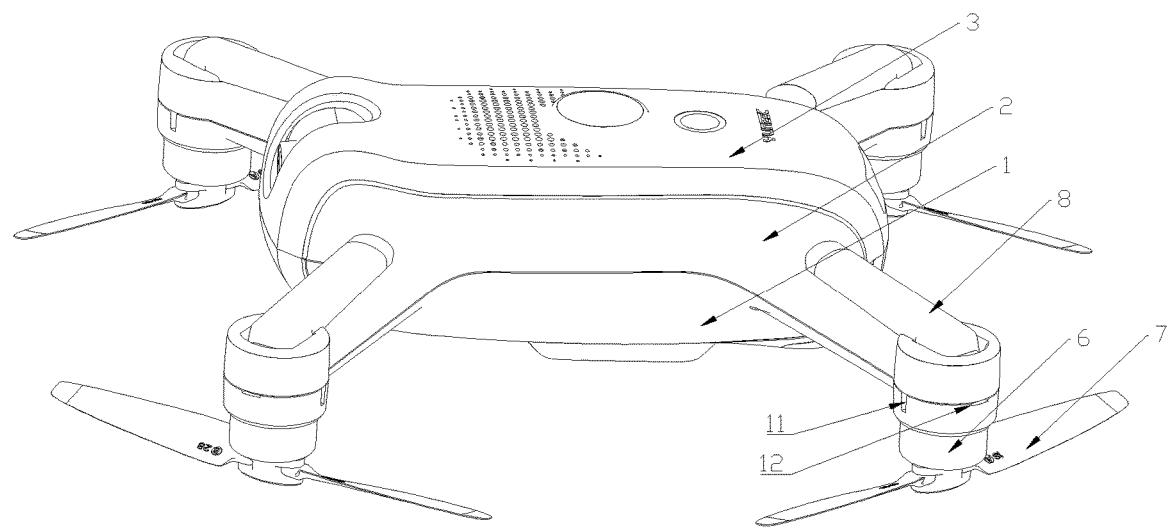
FIG. 3 is a wholly-assembled structural schematic diagram of the multi-rotor UAV according to the first embodiment of the present invention.

Referring to FIGS. 1 and 3, a connection part of the bottom cover 3 and the window edge of the window 200 is a curved part that gradually curves towards the upper aircraft housing at the fuselage head and the fuselage tail. A shape of the bottom cover 3 matches with a shape of the fuselage, so that a half of the internal aircraft cavity is basically opened when the bottom cover 3 is opened, thus while assembling and disassembling the electronic apparatus 4, the barrier is less, and the overall contour is smoother. The curved part also has a lens installation hole and a switch channel for controlling the work of the UAV.

As shown in FIGS. 1 and 3, the bottom cover 3 has a lens through-hole therein corresponding to the fuselage head for allowing a lens in the internal aircraft cavity to extend outwardly; the lens is able to rotate within the lens through-hole.

The bottom cover 3 further has a ventilation hole 32 for dissipating heat from the electronic apparatus 4 in the internal aircraft cavity, so as to optimize the heat dissipation performance of the whole UAV.

The lens through-hole, a switch channel or the ventilation hole 32 is provided on the bottom cover, which has an advantage that since a position of the bottom cover where the lens through-hole, the switch channel or the ventilation hole 32 provided is more fragile than other parts of the bottom cover, when these positions are damaged, only the bottom cover needs to be replaced without replacing the aircraft housings.

The bottom cover 3 is buckled with the lower aircraft housing 2 to remove the screw installation, so that the UAV is lighter in weight, more convenient in connection and easy to be maintained.

Figure 2:
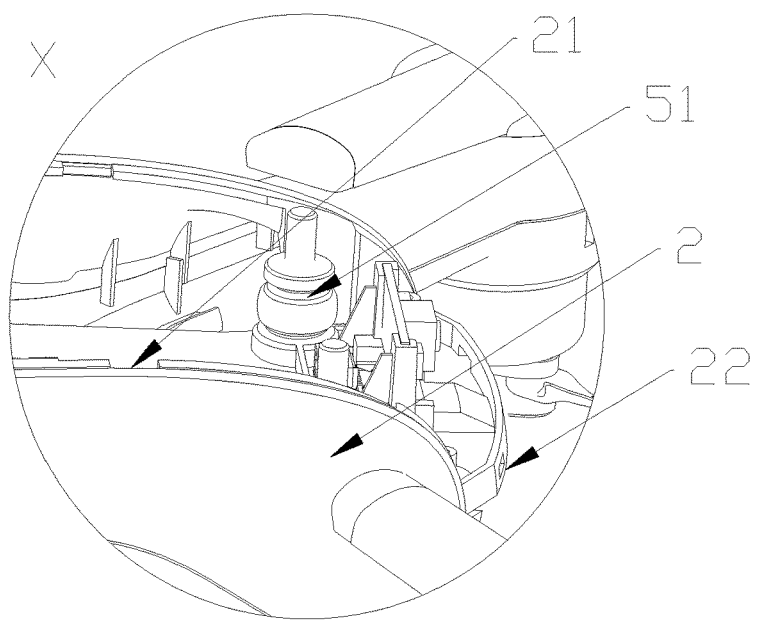
FIG. 2 is partially enlarged view of an X part of the multi-rotor UAV in FIG. 1.

Referring to FIGS. 1 and 2, two hooks 31 which are protruded outwardly are respectively located at two sides of a middle portion of the bottom cover 3. As shown in FIG. 1, there are two hooks 31 which are protruded outwardly and located at each side of the middle portion of the bottom cover 3, which is not as a limitation and can be more. A hook hole 21 for cooperating with each hook 31 is provided at a position of the window edge at a middle portion of the window 200 of the lower aircraft housing 2 corresponding to each outwardly protruded hook 31 on the bottom cover, so as to buckle with each outwardly protruded hook 31 on the bottom cover 3. An inwardly protruded hook (not shown in the drawings) is located at a tail of the bottom cover 3, a hook hole 22 for cooperating with the inwardly protruded hook is provided at a position of the window edge at the tail of the window 200 of the lower aircraft housing 2 corresponding to the inwardly protruded hook, so as to buckle with the inwardly protruded hook. Preferably, no hook is located at a front end of the bottom cover 3 for facilitating assembling and disassembling. While assembling, each outwardly protruding hook 31 in the middle portion are firstly buckled with the corresponding hook hole 21, and then the inwardly protruding hook at the tail is buckled with the corresponding hook hole 22; while disassembling, the order is reversed, so that the connection is more stable and the assembling and disassembling are more convenient.

The electronic apparatus 4 comprises multiple circuit modules and a circuit board, wherein the multiple circuit modules are modularly assembled to the circuit board, so that after all the multiple circuit modules are assembled, the complete circuit board is installed to the internal aircraft cavity, so as to reduce connection components in the internal aircraft cavity and decreases the complexity of the fuselage mold. The circuit board is connected with the upper aircraft housing through a vibration attenuation connector 51, a vibration attenuation pad 52 is located between the circuit board and the closed bottom cover to more stabilize the electronic apparatus 4 and reduce the vibration interference.

Referring to FIGS. 1 and 3, the multi-rotor UAV further comprises multiple propeller seats 6 and multiple paddles 7, wherein the propeller seats 6 and the paddles 7 are connected and installed to the aircraft arms to provide power for aircraft takeoff through rotation.

Figure 4:
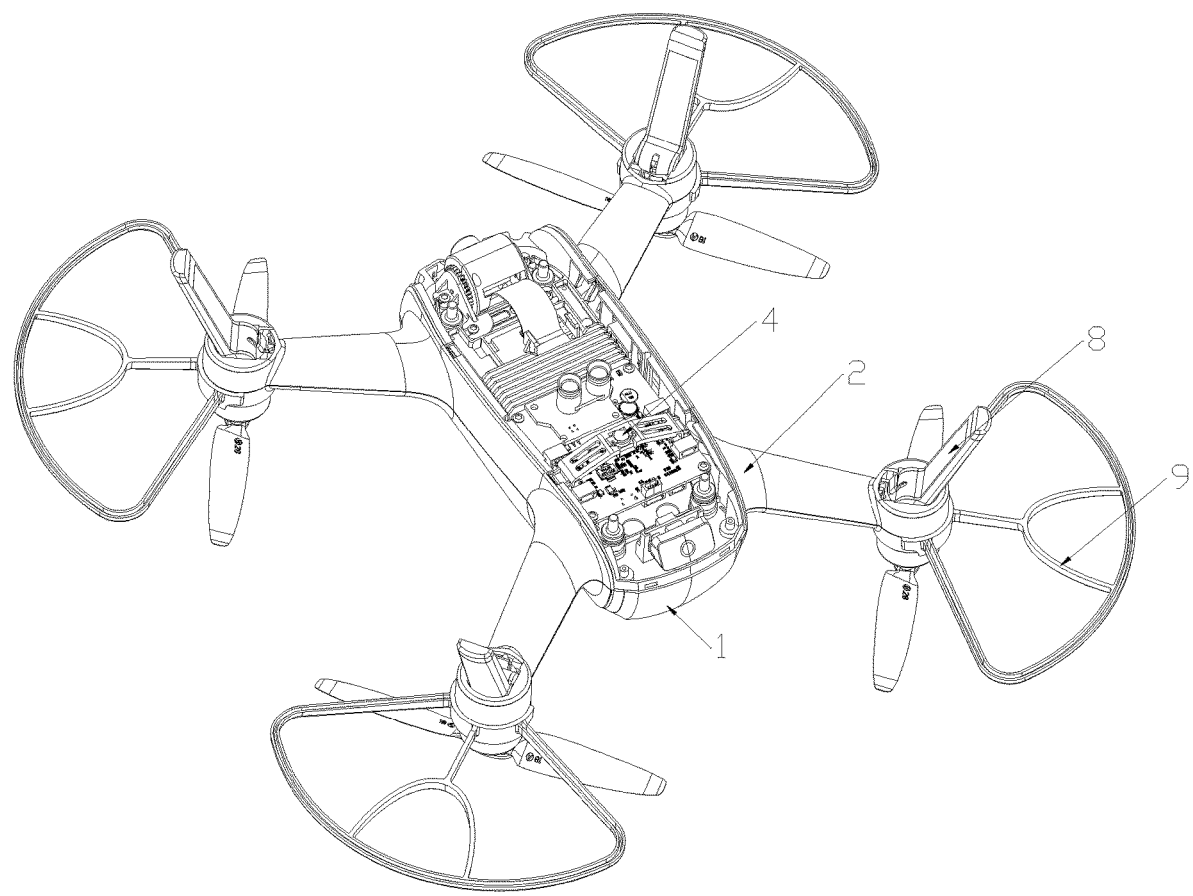
FIG. 4 is a structural schematic diagram of a multi-rotor UAV without a base cover according to a second embodiment of the present invention.

As shown in FIG. 4, the multi-rotor UAV further comprises multiple protection frames 9 each of which comprises an embracing portion and an expanding portion, wherein a projection is located at an inner side of the embracing portion. A side wall of every aircraft arm where one propeller seat 6 and one paddle 7 are installed has slots. As shown in FIG. 3, the side wall has a vertical slot 11 and a transverse slot 12 for respectively limiting the embracing portion of one protection frame along a vertical direction and a transverse direction. The embracing portion of one protection frame 9 embraces the side wall of one aircraft arm and the projection is inserted into the slots. The expanding portion is adapted for blocking collision of outside world with the paddle 7, an expanding length of the expanding portion is smaller than a length of the single-side paddle 7. The paddle 7 is able to be protected for avoiding a sudden falling due to the rotation of the paddle 7.

Referring to FIGS. 3 and 4, the multi-rotor UAV further comprises a foldable landing stand 8 which is located below a corresponding propeller seat 6 and a corresponding paddle 7 of every aircraft arm and is able to rotate relatively to the connection position of every aircraft arm, so as to be folded or unfolded.

Figure 5:
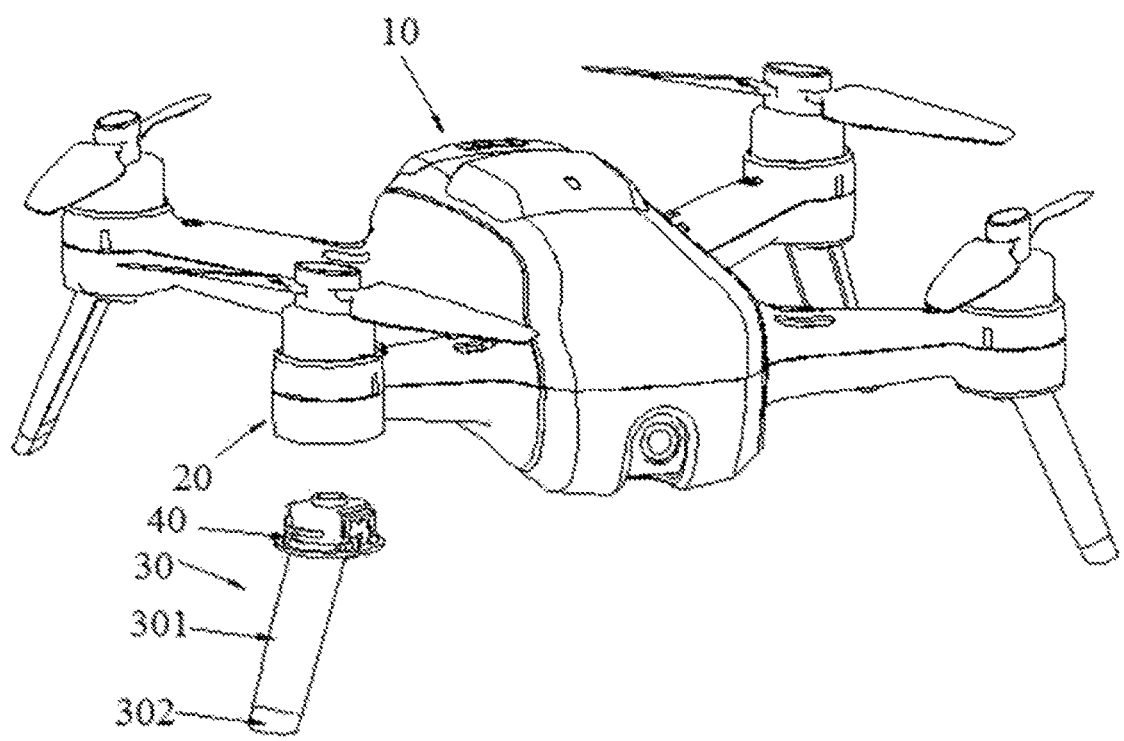
FIG. 5 is structural schematic diagram of a multi-rotor UAV.
Figure 6:
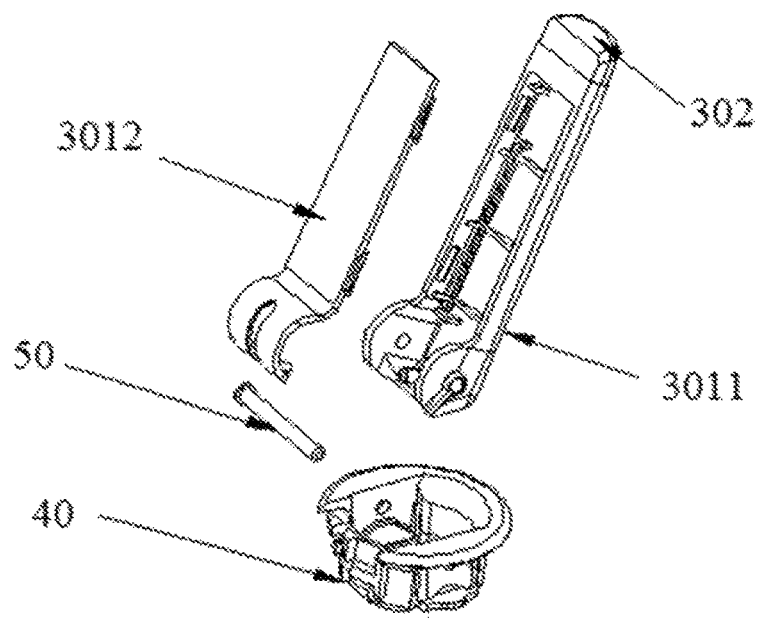
FIG. 6 is an exploded structural schematic diagram of landing support legs and connectors.
Figure 7:
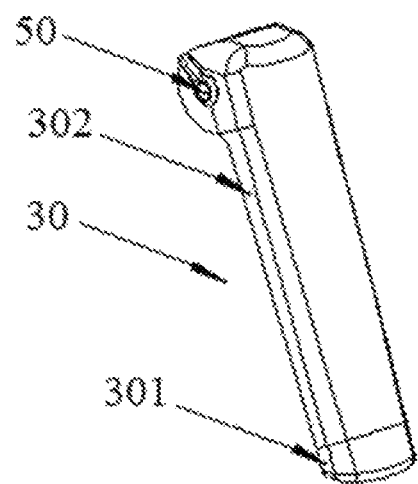
FIG. 7 a wholly-assembled structural schematic diagram of the landing support legs.

Referring to FIGS. 5 to 7, according to one embodiment, a multi-rotor UAV comprises a fuselage 10, four aircraft wings 20 and a landing stand. A needed electronic module is located inside the fuselage 10. One end of every aircraft wing 20 is connected with the fuselage 10, and the other end of every aircraft wing 20 is connected with a propeller.

The landing stand comprises four landing support legs 30. Every landing support leg 30 is corresponding installed below an outermost end of one aircraft wing 20. A landing support structure is formed by the four landing support legs 30. Every landing support leg 30 is located below a corresponding propeller, so that when the UAV lands, the impact produced by every propeller is able to be directly transferred to a corresponding landing support leg 30. Since every landing support leg 30 is located at the outermost end of a corresponding aircraft wing 20, the center of gravity of the UAV is more stable, so that the sideway dumping of the UAV does not easily occur due to instable center of gravity;

and also, the contact area of the UAV and the ground is reduced, which saves material costs and is light in weight.

Every landing support leg 30 comprises a main pole 301 and a base soft rubber 302, wherein the base soft rubber 302 enwraps a bottom of the main pole 301 for buffering. The smaller the landing area of every landing support leg 30, the greater the impact force. However, after providing the base soft rubber 302 for the landing point, the impact is reduced to a large extent. When the UAV takes off or lands, the vibration of the UAV is reduced through the buffering between the UAV and the ground via the base soft rubber 302.

According to one example, the base soft rubber 302 and the main pole 301 of every landing support leg 30 is integrally formed through a two-color injection molding process, that is, the base soft rubber 302 and the main pole 301 of every landing support leg 30 are manufactured through an integral formation process, no extra connector is provided there between, which is more stable in structure and beautiful in appearance.

According to another example, the base soft rubber 302 of every landing support leg 30 is attached to a bottom of the main pole 301 through adhesive pieces, or the base soft rubber 302 of every landing support leg 30 is fixed to the bottom of the main pole 301 through screws.

Referring to FIGS. 5 and 6, a connector 40 is connected with a head portion of the main pole 301 and is detachably connected with the outermost end of a corresponding aircraft wing 10, so as to achieve the detachable landing stand, to convenient for repairing and replacing the landing stand. The specific detachable manners are not limited.

The main pole 301 is rotatably connected with a corresponding connector 40 to fold a corresponding landing support leg 3 below a corresponding aircraft wing 20, so as to convenient for storing, folding and unfolding the UAV. At the unfolded state, the lower every landing support leg 30, the farther away from the fuselage 10, making the support more stable.

Of course, in order to avoid the random rotation of the landing support legs 30 in normal usage process, a limit structure of every landing support leg 30 is located at a corresponding position at the folded or unfolded state, for temporarily limiting the random action of every landing support leg 30.

Referring to FIGS. 6 and 7, both the main pole 301 and the connector 40 have a shaft hole, a rigid shaft 50 passes through the shaft hole of both the main pole 301 and the connector 40 to be fixed with one of the main pole 301 and the connector 40. Through a cooperation between the rigid shaft 50 and the shaft hole, the main pole 301 and the connector 40 are able to rotate relatively to each other, so as to fold and unfold every landing support leg 30.

Referring to FIG. 6, an interior of the main pole 301 is hollow to form an accommodating cavity, which is able to not only reduce the weight of every landing support leg 30, but save the space through sufficiently utilizing the accommodating cavity to accommodate other needed modules or components of the UAV.

The main pole 301 comprises a vertical groove 3011 and a cover plate 3012, wherein the cover plate 3012 is able to open or close the vertical slot 3011; the vertical slot 3011 and the cover plate 3012 forms the accommodating cavity at a closed state. Components in the vertical slot 3011 are able to be replaced through opening the cover plate 3012 to achieve the replacement and arrangement of the components, for flexibly using the space of the accommodating cavity.

According to one example, the cover plate 3012 and the vertical slot 3011 are respectively connected at an end connection position through a plug-in and a first slot, and are respectively connected at a body connection position through a second slot and a hook. As shown in FIG. 6, the cover plate 3012 and the vertical slot 3011 are respectively connected at a position near the connector 40 through the plug-in and the first slot to convenient for achieving open and close, and are respectively connected at a position far away from the connector 40 through the second slot and the hook, so as to make the connection firmer.

While the present invention has been described by preferred embodiments mentioned above, it should be understood that the present invention is not limited to the specific embodiments; anyone skilled in the art can make possible variations and modifications without departing from the spirit and scope of the present invention, and therefore, the protection scope of the present invention should be subject to the scope defined by the claims of the present invention.

What is claimed is:

1. A multi-rotor UAV (unmanned aerial vehicle) comprising a fuselage and multiple aircraft arms, wherein the fuselage comprises an upper fuselage casing, a lower fuselage casing and a bottom cover; the aircraft arms comprise upper aircraft arms and lower aircraft arms; the upper fuselage casing and the upper aircraft arms are integrally formed to obtain an upper aircraft housing; the low fuselage casing and the lower aircraft arms are integrally formed to obtain a lower aircraft housing; the upper aircraft housing is in non-detachable connection with the lower aircraft housing, so as to form an internal aircraft cavity for accommodating an electronic apparatus; the lower aircraft housing has a window; the bottom cover is detachably connected with the lower aircraft housing to open or close the window.

2. The multi-rotor UAV, as recited in claim 1, wherein the window is provided from a fuselage head to a fuselage tail, the bottom cover matches with a window edge of the window for connection.

3. The multi-rotor UAV, as recited in claim 2, wherein a connection part of the bottom cover and the window edge of the window is a curved part that gradually curves towards the upper aircraft housing at the fuselage head and the fuselage tail.

4. The multi-rotor UAV, as recited in claim 2, wherein the bottom cover has a lens through-hole therein corresponding to the fuselage head for allowing a lens in the internal aircraft cavity to extend outwardly.

5. The multi-rotor UAV, as recited in claim 3, wherein the bottom cover is buckled with the lower aircraft housing.

6. The multi-rotor UAV, as recited in claim 4, wherein the bottom cover is buckled with the lower aircraft housing.

7. The multi-rotor UAV, as recited in claim 5, wherein two hooks which are protruded outwardly are respectively located at two sides of a middle portion of the bottom cover, an inwardly protruded hook is located at a tail of the bottom cover, a hook hole for cooperating with the inwardly protruded hook is provided at a position of the window edge at the tail of the window of the lower aircraft housing corresponding to the inwardly protruded hook.

8. The multi-rotor UAV, as recited in claim 6, wherein two hooks which are protruded outwardly are respectively located at two sides of a middle portion of the bottom cover, an inwardly protruded hook is located at a tail of the bottom cover, a hook hole for cooperating with the inwardly protruded hook is provided at a position of the window edge at the tail of the window of the lower aircraft housing corresponding to the inwardly protruded hook.

9. The multi-rotor UAV, as recited in claim 1, wherein the electronic apparatus comprises multiple circuit modules and a circuit board, wherein the multiple circuit modules are modularly assembled to the circuit board, the circuit board is connected with the upper aircraft housing through a vibration attenuation connector, a vibration attenuation pad is located between the circuit board and the closed bottom cover.

10. The multi-rotor UAV, as recited in claim 1, further comprising multiple propeller seats and multiple paddles, wherein the propeller seats and the paddles are connected and installed to the aircraft arms.

11. The multi-rotor UAV, as recited in claim 10, further comprising multiple protection frames each of which comprises an embracing portion and an expanding portion, wherein a projection is located at an inner side of the embracing portion; a side wall of every aircraft arm where one propeller seat and one paddle are installed has slots; the embracing portion of one protection frame embraces the side wall of one aircraft arm and the projection is inserted into the slots.

12. The multi-rotor UAV, as recited in claim 10, further comprising a foldable landing stand which is located below a corresponding propeller seat and a corresponding paddle of every aircraft arm and is able to rotate relatively to the connection position of every aircraft arm, so as to be folded or unfolded.

* * * * *